United States Patent [19]

Schmidt et al.

[11] Patent Number: 5,214,336
[45] Date of Patent: May 25, 1993

[54] MOTOR AND/OR GENERATOR IN WHICH RADIALLY PROJECTING POLE SHANKS ARE LATERALLY OFFSET AT AN ANGLE RELATIVE TO THE RADIAL CENTER LINE OF SYMMETRY OF A STATOR SECTOR

[75] Inventors: Helmut Schmidt, Reichenberg; Wolfgang Weinhold, Würzburg; Udo Winter, Kürnach, all of Fed. Rep. of Germany

[73] Assignee: Siemens Aktiengesellschaft, Munich, Fed. Rep. of Germany

[21] Appl. No.: 780,143

[22] Filed: Oct. 21, 1991

[30] Foreign Application Priority Data

Oct. 22, 1990 [EP] European Pat. Off. ........ 90120220.0

[51] Int. Cl.$^5$ .............................................. H02K 1/12
[52] U.S. Cl. .................................... 310/254; 310/168; 310/258; 322/50
[58] Field of Search ............... 310/254, 258, 106, 109, 310/168, 182-185, 194, 192, 216, 218, 45, 91, 179, 180, 188, 190, 191; 318/254, 701; 322/50, 59, 64

[56] References Cited

U.S. PATENT DOCUMENTS

| 4,520,287 | 5/1985 | Wang et al. | 310/184 |
| 4,550,280 | 10/1985 | Freise | 318/701 |
| 4,584,513 | 4/1986 | Freise et al. | 318/701 |

FOREIGN PATENT DOCUMENTS

| 0103821 | 11/1985 | European Pat. Off. |
| 0726190 | 10/1942 | Fed. Rep. of Germany |
| 0841103 | 5/1939 | France |

OTHER PUBLICATIONS

European Search Report, dated Jun. 1991 (3 pages).

Primary Examiner—Steven L. Stephan
Assistant Examiner—E. To
Attorney, Agent, or Firm—Kenyon & Kenyon

[57] ABSTRACT

A motor and/or generator functioning according to the reluctance principle, has stator sectors distributed over the circumference of the rotor, each with radially projecting pole shanks around which a concentrated exciter coil part is wrapped. The pole shanks are connected by a short-circuit yoke, in that the pole shanks are laterally offset at an angle relative to the radial center line of symmetry of the stator sector in question. This allows a significant reduction in the structural size, while guaranteeing the operational effectiveness.

20 Claims, 1 Drawing Sheet

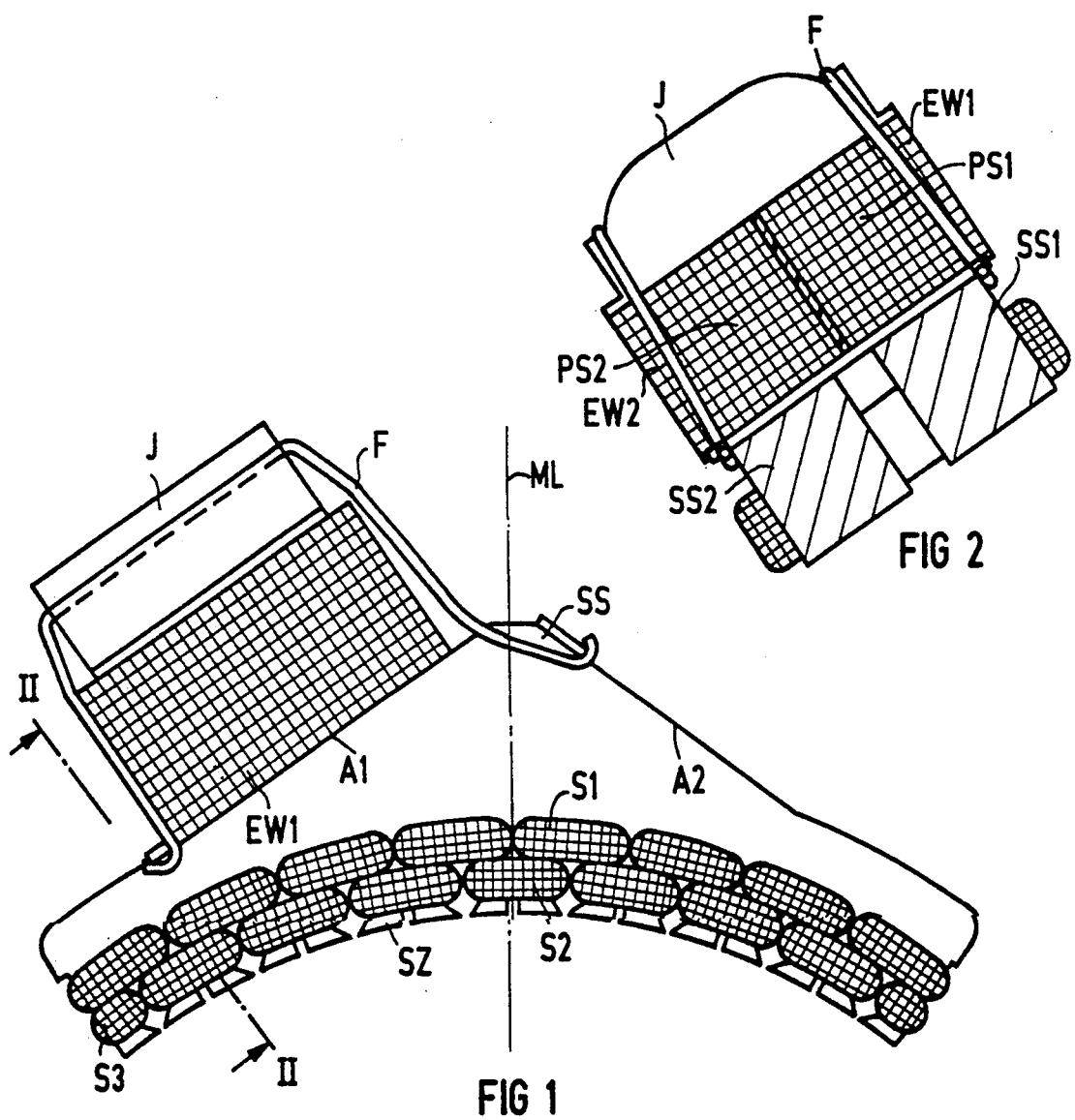

MOTOR AND/OR GENERATOR IN WHICH RADIALLY PROJECTING POLE SHANKS ARE LATERALLY OFFSET AT AN ANGLE RELATIVE TO THE RADIAL CENTER LINE OF SYMMETRY OF A STATOR SECTOR

BACKGROUND OF THE INVENTION

The present invention relates generally to motors and/or generators functioning according to the reluctance principle, and more particularly to such a motor or generator with stator sectors magnetically separated from one another distributed at a tangential distance from one another over the circumference of the rotor. Each of the stator sectors has radially projecting pole shanks, around which a concentrated exciter coil part is wrapped. The radially projecting pole shanks are connected by a short-circuit yoke.

EP-B1-0 103 821 discloses a motor of this type, which has a flywheel mass rotor, and the stator consists of stator sectors magnetically separated from one another, which are distributed at a tangential distance from one another over the circumference of the rotor. Each stator sector consists of at least two stator sector elements with similar gear teeth, arranged at an axial distance and with axially aligned teeth behind one another. Common coil strands are housed in the grooves between the teeth and commutated via an electronic switching device. Each stator sector element opens out, in the center between its left and right tangential end, into a radially projecting pole shank, around which a concentrated exciter coil part is wrapped. The pole shanks of two stator sector elements of a stator sector arranged axially behind one another are excited by opposite polarity, and are connected radially on the outside by a short-circuit yoke.

The present invention is directed to the problem of developing this type of motor and/or generator with a reduced size which can be more universally installed, while simultaneously guaranteeing full operational effectiveness.

SUMMARY OF THE INVENTION

The present invention solves this problem by a lateral angle offset of the pole shanks relative to the radial center line of symmetry of the stator sector. Using a sheet-metal cutout which advantageously demonstrates mirror image symmetry to the center line of symmetry of the stator sector, the arrangement of the pole shanks can be offset either to the left or the right side of the center line of symmetry, using the same assembly and/or production means, thus adapting to the installation space.

According to one embodiment of the present invention, the pole shanks are discrete components and are placed against a corresponding support surface of the sheet metal package of the stator sector, where the pole shanks and/or the short-circuit yoke are pressed against the support surface by a fastening spring. The fastening spring can be fixed in place on the stator sector, in particularly simple manner in terms of assembly technology.

BRIEF DESCRIPTION OF THE DRAWINGS

FIG. 1 depicts a frontal end top view of a stator sector.

FIG. 2 depicts a partial cross-section of the stator sector according to FIG. 1 along the line II—II.

DETAILED DESCRIPTION

FIG. 1 shows an individual stator sector SS in an axial frontal end top view. For example, this stator sector (SS) could be attached to the engine crankshaft housing of a motor vehicle internal combustion engine, and extends over an angle of approximately 70°, of the clutch disk of the internal combustion engine, which is also used as the rotor. As evident in FIG. 2, the stator sector SS consists of two stator sector elements SS1 and SS2, insulated magnetically from one another and arranged at an axial distance behind one another. Each stator sector element SS1 and SS2 is provided with stator teeth SZ. A multi-strand coil with coil strands S1, S2 electrically offset from one another, with the same spool width, is provided as the stator working coil. In order to fully utilize the stator sector (SS), it is advantageous that the tangentially outermost stator teeth each hold one coil strand S3 having a reduced spool width, preferably reduced in half from that of S2. It is not necessary to discuss the method of operation of the motor and/or generator in greater detail here since that is disclosed in EP-B1-0 103 821.

Each stator sector element SS1 or SS2 opens out into a radially projecting pole shank PS1 or PS2, respectively, around which a concentrated exciter coil part EW1 or EW2, respectively, is wrapped, and which is advantageously structured as a molded spool which can be inserted radially. The radially outermost pole ends of the pole shanks PS1 and PS2 are connected by a short-circuit yoke J.

According to the present invention, the pole shanks PS1 and PS2 are arranged offset laterally by a certain angle, relative to the center line ML of the stator sector SS. The pole shanks PS1 and PS2 consist of discrete components, which rest against a support surface A1 of the sheet metal package of the stator sector SS, radially on the inside. These pole shanks PS1 and PS2 are fixed in place by means of a fastening spring F which extends over the short-circuit yoke J. The spring F is hooked directly or indirectly into the sheet-metal package of the stator sector SS with its ends.

In advantageous manner, the sheet-metal package of the stator sector SS is provided with two surfaces A1 and A2, each of which can be used as a support surface for a pole shank, which are arranged with mirror-image symmetry relative to one another and to the center line of symmetry ML. This makes it possible to attach the pole shanks PS1 and PS2, with their exciter coil parts EW1 and EW2 and the short-circuit yoke J, either at the left support surface A1 or at the right support surface A2, thus adapting to the installation conditions. In case greater performance is needed, one pole shank arrangement can be provided with exciter coil parts and short-circuit yoke at each of the two support surfaces A1 and A2.

What is claimed is:

1. A motor functioning according to the reluctance principle, comprising:
    a) a rotor
    b) a plurality of stator sectors magnetically separated from one another and distributed over a circumference of the rotor, each of said plurality of stator sectors including:
        (i) a radial center line of symmetry radially dividing the stator sector in half;

(ii) a pair of radially projecting pole shanks disposed in a lateral angle offset arrangement relative to said radial center line of symmetry;

(iii) a short circuit yoke coupling said radially projecting pole shanks; and (iv) each radially projecting pole shank being wrapped by a concentrated exciter coil part.

2. The motor according to claim 1, wherein each of said plurality of stator sectors further comprises a corresponding support surface, wherein said pole shanks comprise discrete components placed against said corresponding support surface.

3. The motor according to claim 2, each of said plurality of stator sectors including a fastening spring, wherein said pole shanks and said short-circuit yoke can be placed against said support surface by means of said fastening spring.

4. The motor according to claim 1, further comprising a second pair of pole shanks for each of said plurality of stator sectors each pair of pole shanks offset at an angle on either side of said center line of symmetry and a short-circuit yoke provided for each pair of pole shanks.

5. The motor according to claim 2, further comprising a second pair of pole shanks for each of said plurality of stator sectors each pair of pole shanks offset at an angle on either side of said center line of symmetry and a short-circuit yoke provided for each pair of pole shanks.

6. The motor according to claim 3, further comprising a second pair of pole shanks for each of said plurality of stator sectors each pair of pole shanks offset at an angle on either side of said center line of symmetry and a short-circuit yoke provided for each pair of pole shanks.

7. The motor according to claim 1, wherein each of said plurality of stator sectors further comprises a sheet-metal cutout having mirror-image symmetry relative to said center line of symmetry of each of said plurality of stator sectors.

8. The motor according to claim 2, wherein each of said plurality of stator sectors further comprises a sheet-metal cutout having mirror-image symmetry relative to said center line of symmetry of each of said plurality of stator sectors.

9. The motor according to claim 3, wherein each of said plurality of stator sectors further comprises a sheet-metal cutout having mirror-image symmetry relative to said center line of symmetry of each of said plurality of stator sectors.

10. The motor according to claim 4, wherein each of said plurality of stator sectors further comprises a sheet-metal cutout having mirror-image symmetry relative to said center line of symmetry of each of said plurality of stator sectors.

11. A generator functioning according to the reluctance principle, comprising:

a) a rotor;

b) a plurality of stator sectors magnetically separated from one another and distributed over a circumference of the rotor, each of said plurality of stator sectors including:

(i) a radial center line of symmetry radially dividing the stator sector in half;

(ii) a pair of radially projecting pole shanks disposed in a lateral angle offset arrangement relative to said radial center line of symmetry;

(iii) a short circuit yoke coupling said radially projecting pole shanks; and (iv) each radially projecting pole shank being wrapped by a concentrated exciter coil part.

12. The generator according to claim 11, wherein each of said plurality of stator sectors further comprises a corresponding support surface, wherein said pole shanks comprise discrete components placed against said corresponding support surface.

13. The generator according to claim 12, each of said plurality of stator sectors including a fastening spring, wherein said pole shanks and said short-circuit yoke can be placed against said support surface by means of said fastening spring.

14. The generator according to claim 11, further comprising a second pair of pole shanks for each of said plurality of stator sectors each pair of pole shanks offset at an angle on either side of said center line of symmetry and a short-circuit yoke provided for each pair of pole shanks.

15. The generator according to claim 12, further comprising a second pair of pole shanks for each of said plurality of stator sectors each pair of pole shanks offset at an angle on either side of said center line of symmetry and a short-circuit yoke provided for each pair of pole shanks.

16. The generator according to claim 13, further comprising a second pair of pole shanks for each of said plurality of stator sectors each pair of pole shanks offset at an angle on either side of said center line of symmetry and a short-circuit yoke provided for each pair of pole shanks.

17. The generator according to claim 11, wherein each of said plurality of stator sectors further comprises a sheet-metal cutout having mirror-image symmetry relative to said center line of symmetry of each of said plurality of stator sectors.

18. The generator according to claim 12, wherein each of said plurality of stator sectors further comprises a sheet-metal cutout having mirror-image symmetry relative to said center line of symmetry of each of said plurality of stator sectors.

19. The generator according to claim 13, wherein each of said plurality of stator sectors further comprises a sheet-metal cutout having mirror-image symmetry relative to said center line of symmetry of each of said plurality of stator sectors.

20. The generator according to claim 14, wherein each of said plurality of stator sectors further comprises a sheet-metal cutout having mirror-image symmetry relative to said center line of symmetry of each of said plurality of stator sectors.

\* \* \* \* \*